United States Patent [19]

Yamaguchi

[11] Patent Number: 5,722,781
[45] Date of Patent: Mar. 3, 1998

[54] PRINTING APPARATUS

[75] Inventor: Shuzo Yamaguchi, Tosu, Japan

[73] Assignee: Matsushita Electric Industrial Co., Ltd.

[21] Appl. No.: 444,059

[22] Filed: May 18, 1995

[30] Foreign Application Priority Data

Jun. 17, 1994 [JP] Japan ................................. 6-135545

[51] Int. Cl.$^6$ ................................................. H04N 1/32
[52] U.S. Cl. ............................ 400/61; 358/401; 395/113
[58] Field of Search .......................... 400/54, 74, 76, 400/61; 395/114, 113; 358/401, 404, 444, 468

[56] References Cited

U.S. PATENT DOCUMENTS

| | | | |
|---|---|---|---|
| 5,287,194 | 2/1994 | Lobiondo | 395/114 |
| 5,293,463 | 3/1994 | Masuda | 395/113 |
| 5,539,531 | 7/1996 | Propach et al. | 358/468 |
| 5,598,533 | 1/1997 | Yokota et al. | 395/114 |
| 5,627,653 | 5/1997 | Nakazato | 358/401 |
| 5,627,658 | 5/1997 | Connors et al. | 395/114 |

FOREIGN PATENT DOCUMENTS

| | | | |
|---|---|---|---|
| 63-212557 | 9/1988 | Japan | 395/114 |
| 2057367 | 2/1990 | Japan | 395/114 |
| 5122429A | 5/1993 | Japan | 395/114 |
| 5130302 | 5/1993 | Japan | 395/114 |
| 5292233A | 11/1993 | Japan | 395/114 |
| 6127079 | 5/1994 | Japan | 395/114 |

*Primary Examiner*—Edgar S. Burr
*Assistant Examiner*—Steven S. Kelley
*Attorney, Agent, or Firm*—Watson Cole Stevens Davis, P.L.L.C.

[57] ABSTRACT

A printing apparatus includes: a comparator in which a travelling time relating to the printing state on a unit medium by a printer is compared with a preset time when a facsimile data receiver receives a facsimile reception request on a way where the printer is printing or preparing for printing data received by a computer data receiver so that the comparator outputs a reception mode change request; and a controller for shifting a reception mode into a facsimile data reception mode in accordance with the reception mode change request.

1 Claim, 2 Drawing Sheets

PRINTING APPARATUS

BACKGROUND OF THE INVENTION

The present invention relates to a printing apparatus provided with a function for receiving facsimile data and another function for printing data outputted from an electronic apparatus such as personal computer.

Known is a printer provided with a facsimile function which is connected to a personal computer so that not only it prints character data and image data from the personal computer but also it has a facsimile function. Further, such a printer provided with a facsimile operation has been variously improved so that facsimile data can be received even in the operation of printing data from a personal computer.

First of all, a first prior art example will be described. The printer provided with a facsimile function disclosed in JP-A-63-212557 is configured such that upon reception of facsimile data in the operation of receiving data from a personal computer, the receiving operation of an interface control associated with the personal computer is interrupted while another interface control associated with the facsimile function is made to perform a receiving operation.

In such a configuration of the first prior art example, a sheet of paper on which data is being printed is outputted on a way of printing operation while the purpose of facsimile preferential operation can be carried out because the current printing operation is cancelled upon reception of facsimile data and the mode is shifted to the facsimile reception immediately.

A second prior art example in which such a problem as mentioned above is taken into consideration will be described. The printer provided with a facsimile equipment disclosed in JP-A-5-292233 and JP-A-5-122429 is configured such that upon reception of facsimile data in the operation of receiving data from a personal computer, the facsimile data are printed after printing of the data received from the personal computer have been finished by one page-data and the printed sheet has been put out.

In such a configuration of the second prior art example, however, there is some case where it takes a relatively long time, for example, at least ten and several seconds, for printing by only one sheet because of recent tendency that the printing speed is made lower with the request of lowering price. Accordingly, in spite of the fact that a transmitter side of the facsimile equipment concludes that the a predetermined number of reception request signals have been sent and stops the printing operation before completion of the printing by one sheet, there occurs a state that no facsimile data can be outputted.

Further, in such a configuration of the first prior art example, there is a case where it takes tens minutes for developing image data into a bit map when high quality printing such as high resolution printing, full color printing is carried out, and in such case, the immediately putting out of the sheet on which printing is being carried out upon reception of facsimile data cannot be said to be efficient when printing which takes a long developing time is being carried out.

SUMMARY OF THE INVENTION

It is therefore an object of the present invention to provide a printing apparatus in which a function as a facsimile equipment and another function for printing an output of a personal computer can be switched advantageously from each other to thereby perform high printing efficiently.

According to an aspect of the present invention, the printing apparatus comprises: first data reception means for receiving a reception request signal and print data which are transmitted through a telephone line; second data reception means for receiving print data which are transmitted through another line different from the telephone line; printing means for printing, onto a medium, the print data received by the first and second data reception means; comparison means for comparing a processing time relating to the printing state on a unit medium with a preset time; control means for controlling the printing means so as to preferentially print the print data from the telephone line on the basis of the result of comparison by the comparison means when the first data reception means receives the reception request signal on the way where the printing means is printing the print data received by the second data reception means; setting time change means for changing the preset time; and display means; whereby the control means allows the display means to display information relating to the reception states of the first and second data reception means and/or information relating to the current printing state.

DESCRIPTION OF THE PREFERRED EMBODIMENT

An embodiment of the present invention will be described below with reference to the drawings.

Figure 1:
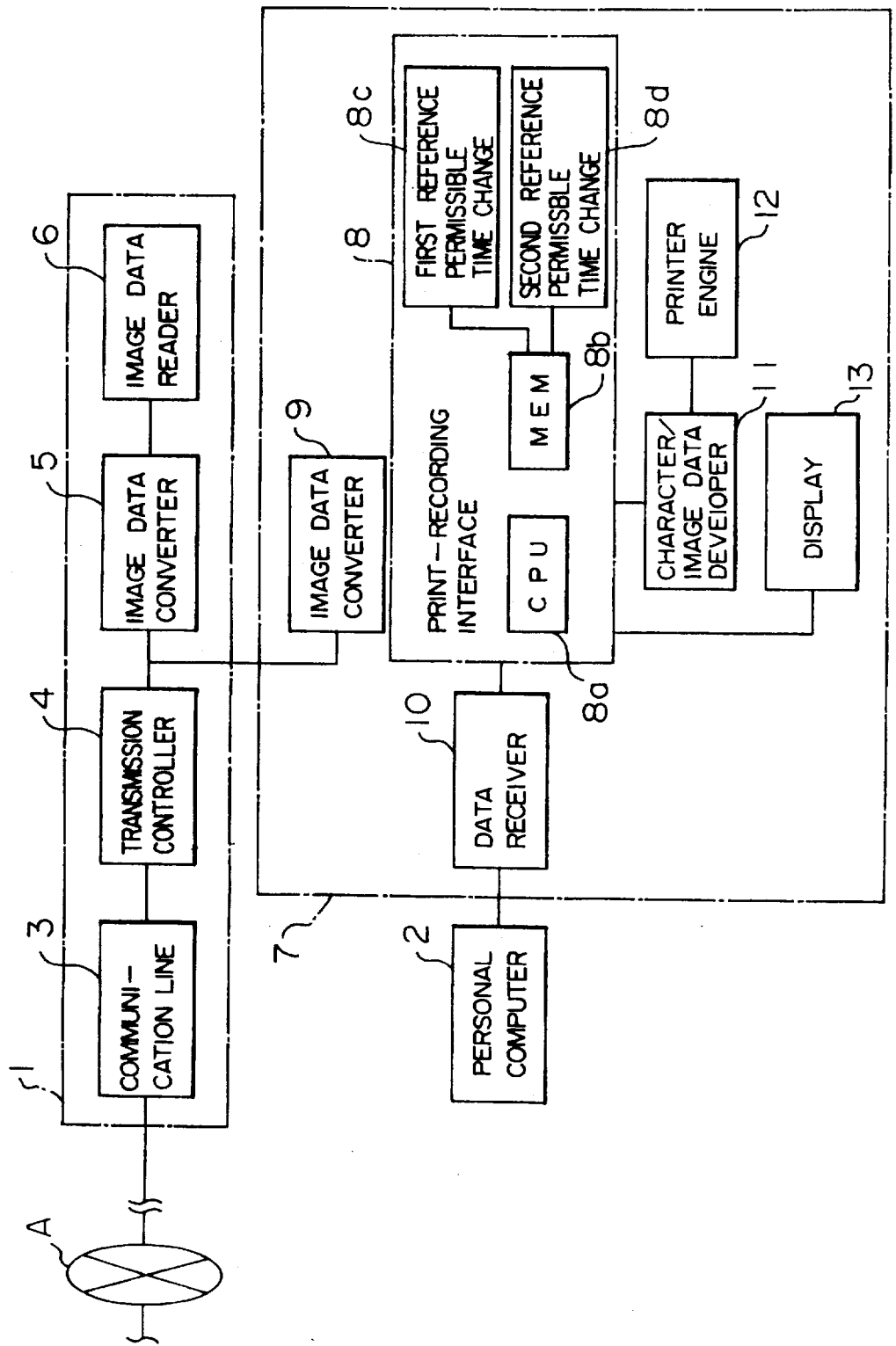
FIG. 1 is a block diagram showing the functional configuration of the printing apparatus according to the present invention.

FIG. 1 is a block diagram of a printing apparatus of the present invention. In FIG. 1, the reference numeral 1 designates a facsimile equipment for transmitting image data; and 2, a personal computer for transmitting character data and image data.

The facsimile equipment 1 is constituted by a communication line 3 connected to a telephone line A, a transmission controller 4, an image data converter 5, and an image data reader 6. These constituent elements of the facsimile equipment 1 are connected to one another in the aforementioned order. The communication line 3 is a line for facsimile communication (communication through a telephone line A). The transmission controller 4 serves to perform transmission procedure and communication control for facsimile transmission/reception.

Further, the image data converter 5 serves to convert image data read out by the image data reader 6 into suitable data to be transmitted through the communication line. The image data reader 6 serves to read out a document to be transmitted by facsimile.

A recorder 7 is connected to the facsimile equipment 1 and to the personal computer 2. The recorder 7 includes a print-recording interface 8, an image data converter 9, a data receiver 10, a character/image data developer 11, and a printer engine 12 connected to the character/image data developer 11. The image data converter 9, the data receiver 10 and the character/image data developer 11 are individually connected to the print-recording interface 8. Further, a display 13 for displaying information relating to the state of printing is connected to the print-recording interface 8.

The print-recording interface 8 serves to control the state of communication with the facsimile equipment 1 and the state of data reception from the personal computer 2 and also serves to change over the recording data between data for the facsimile equipment 1 and data for the personal computer 2. The print-recording interface 8 has a processor 8a (hereinafter referred to as "CPU") for performing control by executing an operation procedure which will be described later with reference to FIG. 2, and a memory 8b (hereinafter referred to as "MEM") for storing the operation procedure for the CPU 8a. The MEM 8b stores data corresponding to 15 seconds as a first reference permissible time (T1) to be compared with the time (Te: hereinafter referred to as "printing end time") required for completing the data printing on one sheet of paper on which printing is being carried out in the event a call signal (reception request signal) from an external device such as a facsimile equipment appears in the communication line 3 when the print-recording interface 8 is receiving data from the personal computer 2. Further, the MEM 8b stores data corresponding to 3 minutes as a second reference permissible time (T2) to be compared with the time (Ts: hereinafter referred to as "elapsed time") elapsed after the start of the data printing on one sheet of paper on which printing is being carried out in the event a call signal appears in the communication line 3 when the print-recording interface 8 is receiving data from the personal computer 2.

The first and second reference permissible times (T1 and T2) are variable. That is, a user can change these times (T1 and T2) by means of first reference permissible time changing means 8c and second reference permissible time changing means 8d, respectively.

The image data converter 9 is connected between the transmission controller 4 and the image data converter 5 in the facsimile equipment 1 and serves to convert data received from the facsimile equipment 1 into data to be recorded as an image. The data receiver 10 is connected to the personal computer 2 and serves to receive character/image data from the personal computer 2. The character/image developer 11 serves to develop character/image data into bit map data and to feed the bit map data to the printer engine 12.

The printer engine 12 serves to execute electrophotographic processing such as exposure, development, transfer and fixing, and paper feeding in order to print the character/image data developed by the character/image data developer 11. The speed of paper feeding is 4 sheets of paper per minute. The display 13 serves to display the printing state of the printer engine 12.

The operation of the printing apparatus configured as described above will be described below.

Figure 2:
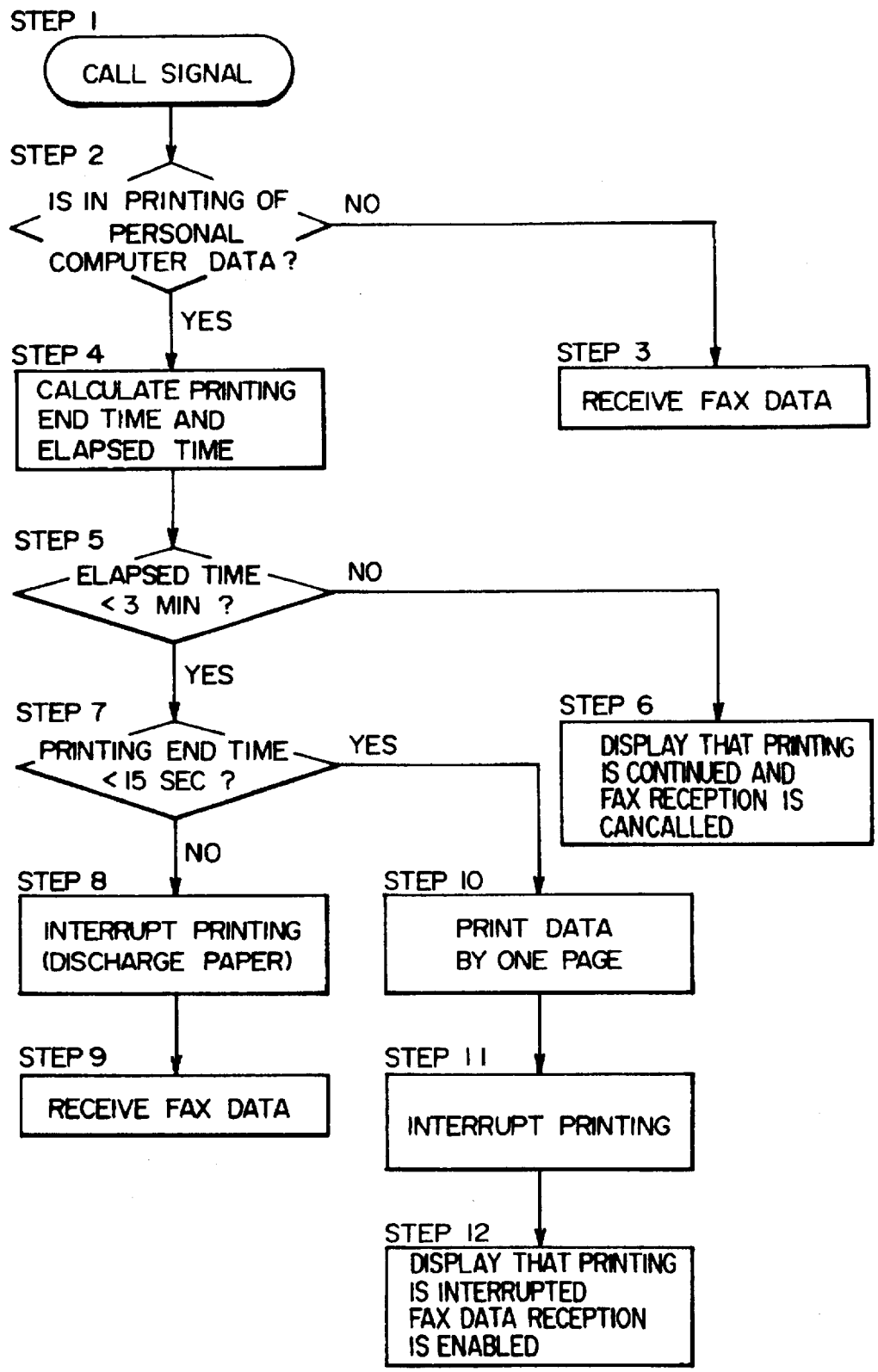
FIG. 2 is a flow chart showing the operation of the printing apparatus according to the present invention.

FIG. 2 is a flow chart of the operation of the printing apparatus according to the present invention. In FIG. 2, there is particularly shown a flow chart of interruption when a call signal appears in the communication line 3. When the appearance of a call signal in the communication line 3 is detected by the transmission controller 4 in a step 1, the print-recording interface 8 decides in a step 2 whether data from the personal computer 2 are on the way of reception through the data receiver 10 or on the way of printing. When the data from the personal computer 2 are neither on the way of reception nor on the way of printing at that time, the transmission controller 4 connects the line in step 3 so that facsimile data are received by the facsimile equipment 1 and converted into data in the form adapted to printing by the image data converter 9, the converted data into the form adapted to printing being printed through the printer engine 12.

In the case a call signal appears in the communication line 3 when it is decided in the step 2 whether data from the personal computer 2 are either on the way of reception or on the way of printing, the print-recording interface 8 calculates, by means of a timer, the elapsed time Ts and the time required for development of image data into bit map data to thereby calculate the printing end time Te in a step 4.

In a step 5, the print-recording interface 8 decides whether the elapsed time Ts is shorter than three minutes (which is the preset second reference permissible time T2) or not. When the elapsed time Ts is not shorter than three minutes, the print-recording interface 8 continues the printing of data received from the personal computer 2 and allows the display 13 to indicate that facsimile communication is canceled.

Although the aforementioned printing is designed so that the data printing is executed continuously on residual sheets, the data printing currently executed can be interrupted by pushing a switch (not shown) provided on the printer or by key input on the personal computer 2.

The continuous printing operation of this embodiment in this step will be described more in detail. Generally, when the time of three minutes or more is required for one-sheet printing, the printing is high-quality image printing in most cases. If the printing is interrupted in this occasion, printing efficiency becomes rather bad because the time of three minutes or more is required for printing the same sheet again. Therefore, this embodiment is designed so that the printing currently executed is continued preferentially.

Further, it is general that a facsimile equipment used businesslike stores document data temporarily and re-tries to perform communication even in the case where communication cannot be performed in the first trial. Therefore, in this embodiment, the fact that facsimile communication is canceled is indicated by the display 13 to give warning to the user.

Although this embodiment has shown the case where the display 13 is provided in the recorder 7, the present invention can be applied to the case where a display of the personal computer 2 is used as the above-mentioned display 13.

Although this embodiment has shown the case where it is decided in the step 5 whether the elapsed time Ts is shorter than three minutes which is a reference permissible time or not, the reference permissible time is not limited to the aforementioned numerical value, three minutes, but this time can be set by the first reference permissible time changing means 8c in accordance with the user's wish or in accordance with the purpose of use of the printing apparatus.

When it is decided in the step 5 that the elapsed time Ts is shorter than three minutes, the print-recording interface 8 decides in a step 7 whether the printing end time Te is shorter than 15 seconds (which is the preset first reference permissible time T1) or not.

When the printing end time Te is shorter than 15 seconds, the data printing on one sheet on which printing is being carried out is completed in a step 10 and then printing is interrupted in a step 11 after the one sheet is discharged. Then, in a step 12, the fact that printing is interrupted is indicated by the display 13 and a state enabled to receive facsimile data is set. If a call signal appears here in the communication line 3, facsimile data are received. If the call signal in the communication line 3 has already disappeared, a state of simple printing interruption is set.

By this operation, printing of only one sheet is executed when the time required for printing the residual part of the sheet is relatively short. Thus, this embodiment can achieve an efficient printing operation.

Although this embodiment has shown the case where it is decided in the step 7 whether the printing end time Te is shorter than 15 seconds as a reference permissible time or not, the reference permissible time is not limited to the aforementioned numerical value of 15 seconds but this time can be set by the second reference permissible time changing means 8d in accordance with the user's wish or in accordance with the performance of the printing apparatus.

When it is decided in the step 7 that the printing end time Te is not shorter than 15 seconds, the print-recording interface 8 interrupts, in a step 8, the data printing on one sheet on which printing is being carried out immediately and ejects the sheet of paper. Then, facsimile data reception is started in a step 9.

By this operation, printing is interrupted immediately when the time required for printing the residual part of one sheet is relatively long, so that this embodiment achieves an efficient printing operation.

What is claimed is:

1. A printing apparatus comprising:

first data reception means for receiving print data through a telephone line;

second data reception means for receiving print data through another line different from the telephone line;

print means for printing on a medium the print data received by said first data reception means or said second data reception means;

set means for measuring a print finish time (t) and deciding a first set time (T1) and a second set time (T2) which is larger than the first set time; and control means for controlling said print means to print the print data received by said second data reception means in the event the print data is received by said first data reception means during printing of the print data received by said second data reception means on a medium, so that (i) when the print finish time (t) is larger than the second set time (T2), printing of the print data is maintained and reception of said first data reception means is rejected, (ii) when the print finish time (t) is smaller than the first set time (T1), printing of the print data is finished and thereafter reception of said first data reception means is started, and (iii) when the print finish time (t) is larger than the first set time (T1) and smaller than the second set time (T2), printing of the print data is interrupted and reception of said first data reception means is started.

* * * * *